E. E. FLORA.
PRESSING AND SEALING MECHANISM.
APPLICATION FILED APR. 20, 1906.

927,033.

Patented July 6, 1909.
8 SHEETS—SHEET 8.

Witnesses:
Geo. L. Gaylord.
John Enders.

Inventor:
Ellsworth E. Flora,
By Dyrenforth, Dyrenforth & Lee,
Attys.

UNITED STATES PATENT OFFICE.

ELLSWORTH E. FLORA, OF CHICAGO, ILLINOIS, ASSIGNOR OF ONE-HALF TO OSCAR J. FRIEDMAN AND ONE-HALF TO CHARLES H. BOHANON, BOTH OF CHICAGO, ILLINOIS.

PRESSING AND SEALING MECHANISM.

No. 927,033.  Specification of Letters Patent.  Patented July 6, 1909.

Application filed April 20, 1906. Serial No. 312,848.

*To all whom it may concern:*

Be it known that I, ELLSWORTH E. FLORA, a citizen of the United States, residing at Chicago, in the county of Cook and State of Illinois, have invented a new and useful Improvement in Pressing and Sealing Mechanism, of which the following is a specification.

My invention relates particularly to pressing and sealing mechanism adapted for use in pressing and sealing packages of currency bills, or the like.

My primary object is to provide a simple and durable machine capable of pressing and sealing packages of currency bills for the purpose of storage or transportation, although it will be understood that the invention may be put to other analogous uses.

In the preferred embodiment of the invention, a press is employed having a movable member upon which is mounted sealing mechanism consisting of a magazine and a riveting or eyelet-applying device. The invention contemplates the use of tape for forming bands about the package to be sealed, the eyelets, or rivets, being employed to join the ends of each band. In the construction illustrated, the tape is wound upon a spool adapted to pass through suitable channels in the machine for the purpose of carrying the tape about the package.

The invention is illustrated in its preferred embodiment in the accompanying drawings, in which—

Fig. 2, a plan view of the same; Fig. 2$^a$, a broken transverse section taken as indicated at line 2$^a$ of Fig. 2.

In the preferred construction, the machine comprises a press A having a movable member A$^1$; eyelet-applying mechanism B carried by a pivoted and transversely shiftable arm B$^1$ mounted on the movable member A$^1$ of the press; and a spool, or bobbin, C, provided with tape $c$ used in tying the bales.

Figures 2, 2A:
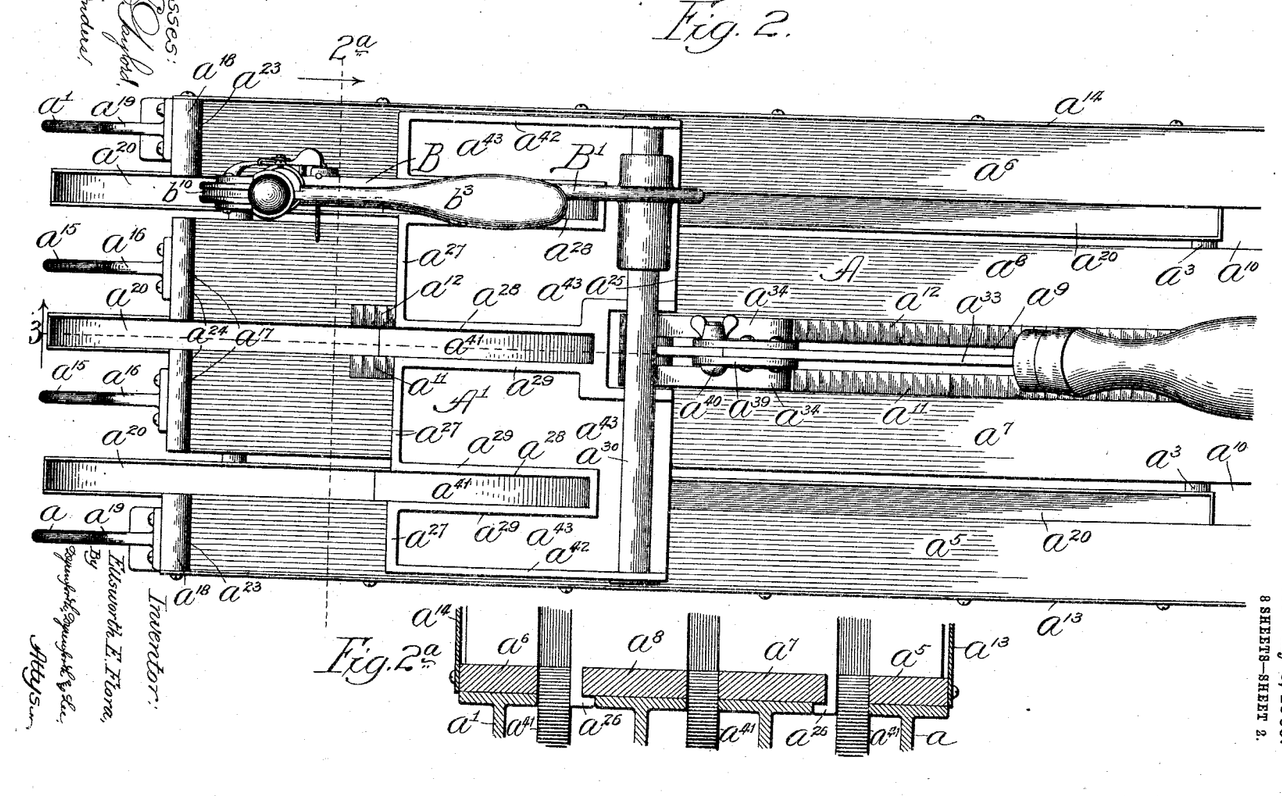
Figure 3:
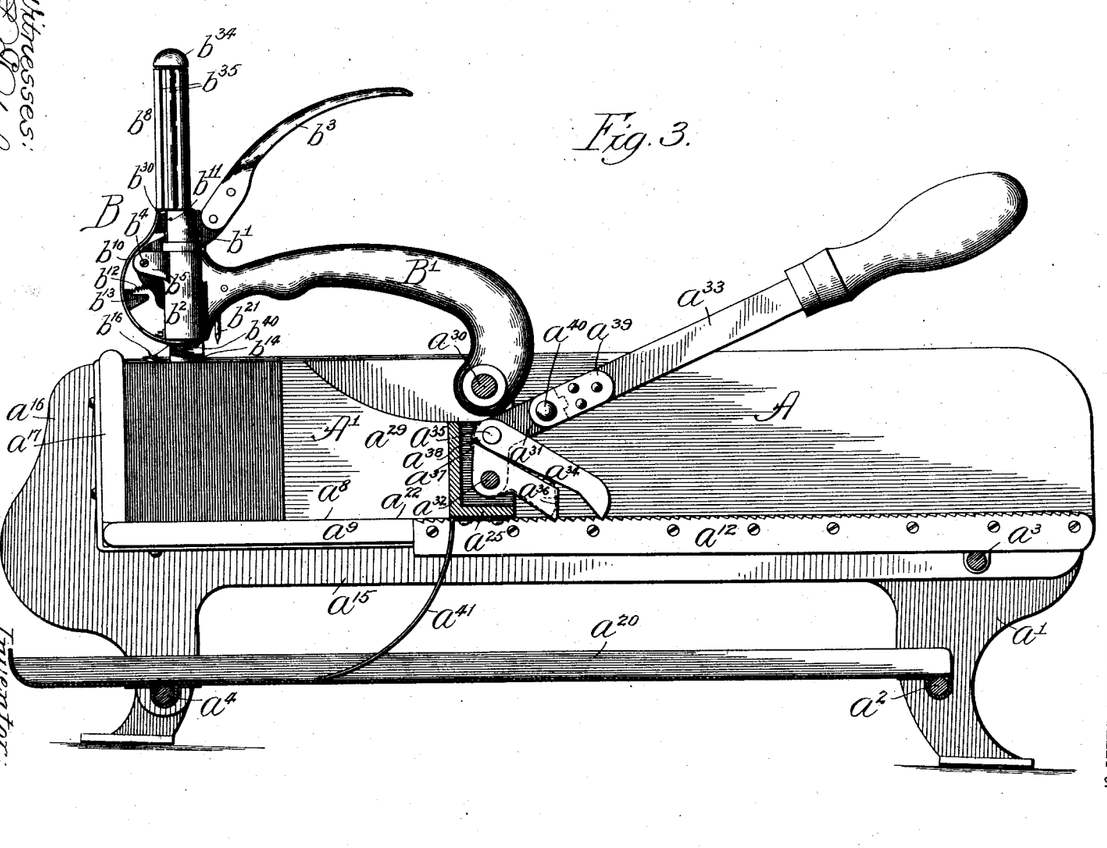
Fig. 3, a longitudinal vertical section taken as indicated at line 3 of Fig. 2.

The stationary portion A of the press preferably comprises a frame having base side members $a$ $a^1$; bolts or cross-members $a^2$ $a^3$ connecting said side members at one end; a bolt $a^4$ connecting said side members at the other end; bottom slats for the body of the press comprising side slats $a^5$ $a^6$ and intermediate slats $a^7$ $a^8$, the intermediate slats being separated from each other by a longitudinal space $a^9$ and from the outside slats by spaces $a^{10}$; a pair of ratchet-bars $a^{11}$ $a^{12}$ set into recesses at the adjacent edges of the slats $a^7$ $a^8$, as shown in Fig. 2; side members $a^{13}$ $a^{14}$ for the body of the press rising from the outer edges of the slats $a^5$ $a^6$; intermediate members, preferably castings, $a^{15}$, carried by the cross rods $a^2$ $a^4$ and supporting the intermediate slats $a^7$ $a^8$, said members $a^{15}$ having upward extensions $a^{16}$ at their front ends supporting vertical end slats $a^{17}$, forming a portion of the front of the body of the press; vertical end slats $a^{18}$ supported by upright extensions $a^{19}$ on the side members $a$ $a^1$ of the base of the frame, the slats $a^{18}$ corresponding with the slats $a^5$ $a^6$ of the bottom of the press; and run-ways $a^{20}$ beneath the slots $a^9$ $a^{10}$ of the bottom of the press, said run-ways preferably sloping downwardly toward the front end of the press and having upwardly curved buffers $a^{21}$ at their front ends for engaging and stopping the tape-carrying spool. The upper surface $a^{22}$ of the bottom of the body of the press preferably slopes forwardly slightly, as shown in Fig. 3, to assist the packages of bills which are to be formed into a bale to stand until the member $A^1$ of the press is brought into action to compress the bale. By referring to Fig. 2, it will be seen that the inner surfaces $a^{23}$ of the vertical slats $a^{18}$ are somewhat out of alinement with the inner surfaces $a^{24}$ of the intermediate vertical slats $a^{17}$, the purpose being to provide more space in the press for the intermediate portion of the bale than for the end portions thereof to accommodate bands of paper encircling the packages forming the components of the bale.

The movable member $A^1$ of the press comprises a slide $a^{25}$ approximately filling the space between the side members $a^{13}$ $a^{14}$ and resting upon the bottom slats of the press, said slide having a guide $a^{26}$ on its lower side engaging the intermediate slats $a^7$ $a^8$, as shown in Fig. 2ª, said slide having also a vertical front end $a^{27}$, the front end and the front portion of the bottom of the slide being provided with slots $a^{28}$ bordered by vertical longitudinal flanges $a^{29}$ joining the corresponding portions of the end member $a^{27}$; a transverse shaft $a^{30}$ supported on the slide, upon which the rear end of the arm $B^1$ is pivoted and transversely slidable; a handle comprising a base portion $a^{31}$ supported on a pivot $a^{32}$ carried by the slide and a removable portion $a^{33}$ fitted upon the base portion; a pair of pawls $a^{34}$ carried by a pivot $a^{35}$ on the portion $a^{31}$; and a pair of pawls $a^{36}$ supported on the pivot $a^{32}$ and having at their upper ends shoulders $a^{37}$ adapted to engage shoulders $a^{38}$ on the base portion of the handle. The pawls $a^{34}$ are adapted to simultaneously engage the teeth of the racks $a^{11}$ $a^{12}$, the teeth of said racks being transversely alined, as shown in Fig. 2. The engaging points of the pawls $a^{36}$ are separated by a half space, so that one of the pawls will always be in readiness to engage a rack tooth. When the handle is swung upwardly, the pawls $a^{34}$ make engagement with fresh teeth of the racks, and when the handle is swung downwardly the movable member, or platen, of the press is actuated, the pawls $a^{36}$ serving to prevent retrograde movement of the platen when the handle is again elevated to take a fresh hold upon the racks. The details of construction of the handle are unimportant, except that it is desirable to have the upper portion of the handle removable, to prevent unauthorized use of the press. Accordingly, the upper portion $a^{33}$ of the handle is equipped with lugs $a^{39}$ which receive between them the upper portion of the base $a^{31}$ of the handle, the connection being made by means of a removable bolt $a^{40}$. The slide $a^{25}$ is equipped with downwardly and forwardly curved members $a^{41}$ which project into the run-ways $a^{20}$ and afford, virtually, curved bottoms for the slots $a^{28}$ of the slide, so that when a spool is dropped through one of the slots $a^{28}$ it will roll into the run-way beneath, regardless of the position of the follower of the press. The flanges $a^{28}$ on the upper side of the slide, together with flanges $a^{42}$ form chambers $a^{43}$ on the upper side of the slide, in any one of which the spool may rest for convenience.

Figures 4, 5, 6, 7:
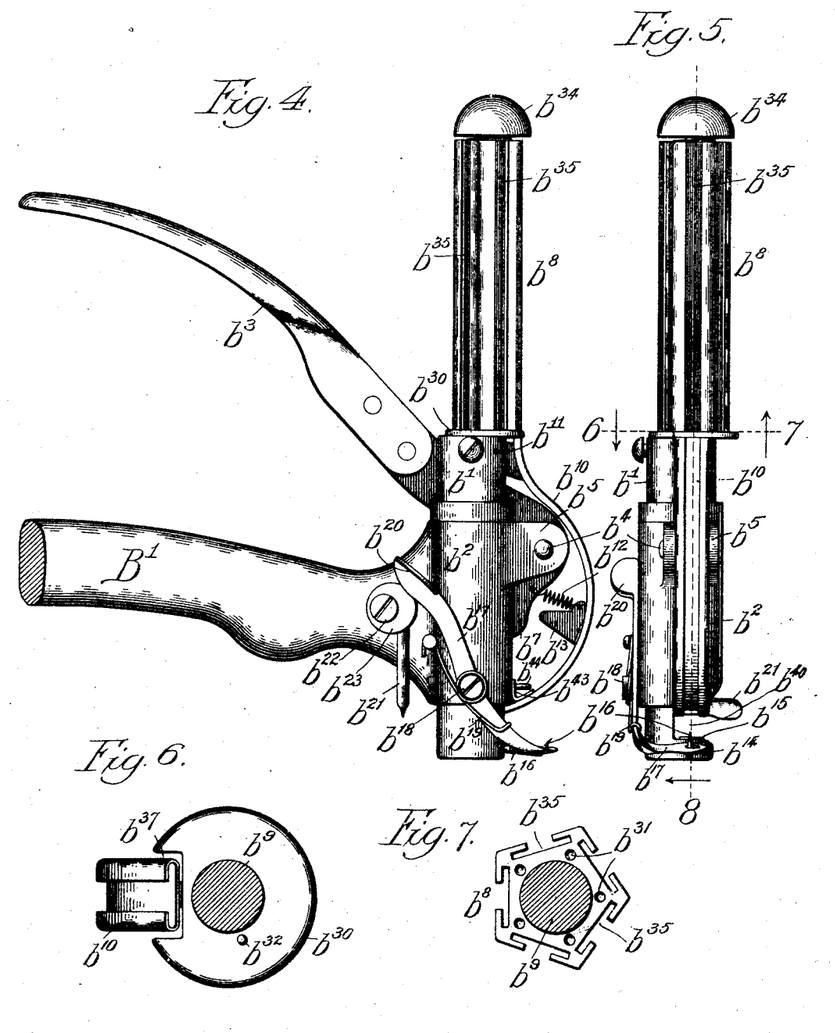
Fig. 4, a broken side elevational view of an arm carried by the movable member of the press and upon which is mounted the eyelet-applying mechanism, including the eyelet magazine.
Fig. 5, a front elevational view of the same.
Figs. 6 and 7, horizontal sections taken as indicated at the lines 6 and 7 of Fig. 5.
Figures 8, 9, 10, 11:
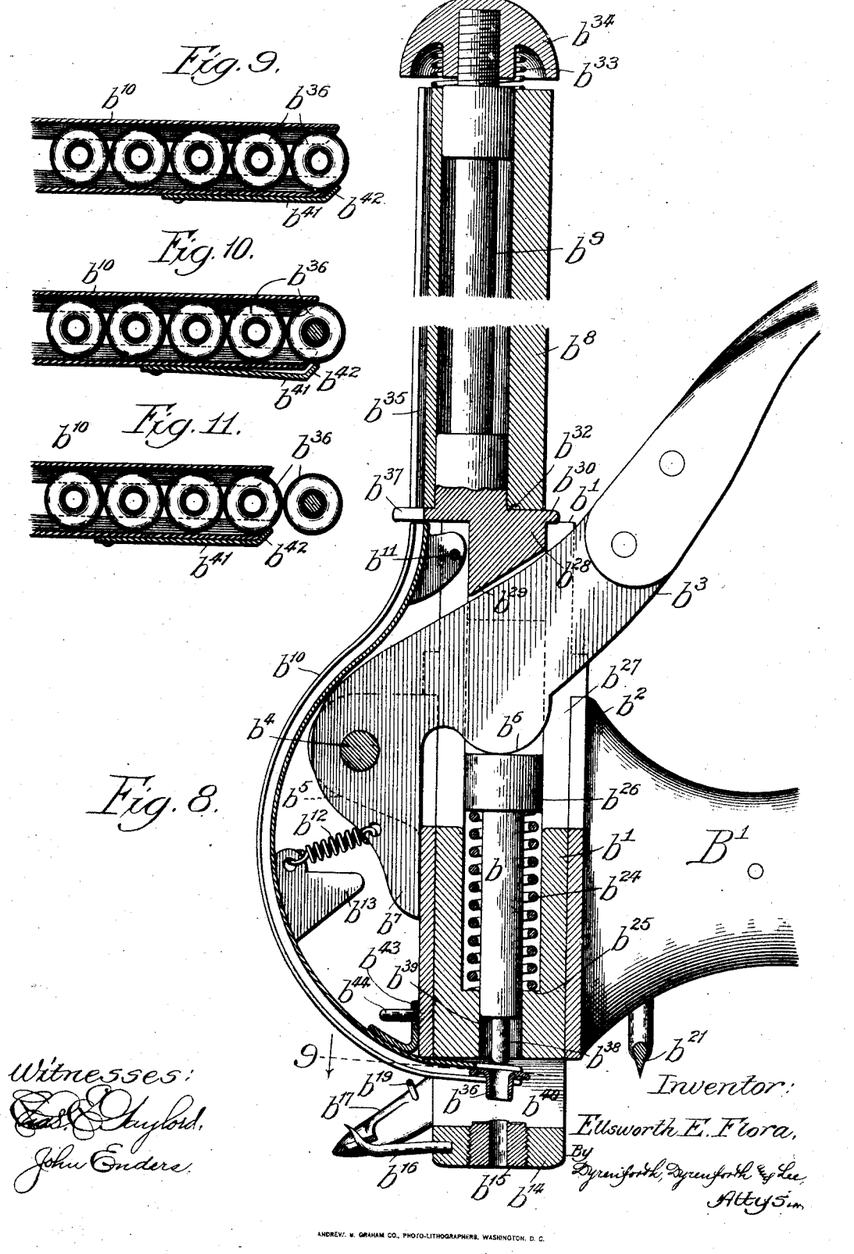
Fig. 8, a vertical section taken as indicated at line 8 of Fig. 5.
Fig. 9, an enlarged broken section taken as indicated at line 9 of Fig. 8, being a section of the lower portion of the eyelet chute.
Fig. 10, a similar section showing one of the eyelets about to escape from the chute, the plunger of the eyelet-applying mechanism being shown in section.
Fig. 11, a similar view showing the eyelet wholly out of engagement with the chute, owing to withdrawal of the chute.

The eyelet-applying mechanism, or rivet-applying mechanism, B comprises a plunger $b$ vertically movable in a bushing $b^1$ received by a tubular head $b^2$ with which the arm $B^1$ is provided; a lever $b^3$ supported on a pivot $b^4$ carried by lugs $b^5$ projecting forwardly from the head $b^2$, said lever having a cam $b^6$ bearing upon the upper end of the plunger $b$ and having also a cam $b^7$ adapted to actuate a movable chute with which the magazine is provided; a revoluble magazine $b^8$ mounted on a stud $b^9$ rising from the upper end of the bushing $b^1$; an eyelet-chute $b^{10}$ supported at its upper portion on a pivot $b^{11}$ carried by the upper end of the bushing $b^1$; a spring $b^{12}$ joining the chute to the adjacent portion of the lever $b^3$; a cam $b^{13}$ connected with the chute and co-acting with the cam $b^7$ of the lever $b^3$; a laterally projecting anvil $b^{14}$ carried by the lower end of the bushing $b^1$ and equipped with a die $b^{15}$ and with a forwardly directed upwardly turned point, or prong, $b^{16}$ serving to engage the free end of the tape; a lever $b^{17}$ supported on a pivot $b^{18}$ carried by the head $b^2$ and having a perforate end fitting over the point of the prong $b^{16}$, said lever being normally held in engagement with said prong by a spring $b^{19}$ and having its upper end equipped with a thumb-piece $b^{20}$; a tape-severing knife $b^{21}$ adjustably connected by a screw $b^{22}$ and a disk $b^{23}$ to the arm $B^1$ adjacent to its head; and a spring $b^{24}$ confined within the barrel, or bushing, $b^1$ between a shoulder $b^{25}$ therein and a head $b^{26}$ on the upper end of the plunger $b$. The bushing $b^1$ is firmly secured within the tubular head $b^2$ of the arm $B^1$, and the bushing and head are provided with a slot $b^{27}$ for the lever $b^3$ to work in. The stud $b^9$ is formed with a base portion $b^{28}$ which fits rigidly within the upper portion of the bushing $b^1$ and has a slot $b^{29}$ corresponding with the slot $b^{27}$. The base portion $b^{28}$ has formed integrally with it a flange $b^{30}$ which bears upon the upper end of the bushing. The magazine $b^8$ comprises a sleeve which rests upon the flange $b^{30}$ and is provided, as shown in Fig. 7, with a series of depressions, or sockets, $b^{31}$ adapted to engage a lug $b^{32}$ on the upper surface of the flange $b^{30}$. The magazine is confined between the flange $b^{30}$ and a spring $b^{33}$ housed by a nut $b^{34}$ applied to the upper end of the stud $b^9$. The magazine is of angular cross-section, as shown in Fig. 7, and has a plurality of longitudinal T-slots $b^{35}$ adapted to be loaded with eyelets $b^{36}$, of the form shown in Fig. 8. The magazine can be lifted out of engagement with the lug $b^{32}$ and rotated upon its axis to bring any one of its series of slots $b^{35}$ into alinement with the upper end of the chute $b^{10}$. The flange $b^{30}$ is cut away at the point $b^{37}$, as indicated in Figs. 6 and 9, to afford a passage from the lower end of the slot $b^{35}$ which chances to be in use to the upper end of the chute $b^{10}$. The lower end of the plunger $b$ is of reduced cross-section, as shown at $b^{38}$, to permit it to enter an eyelet; and at the upper end of the reduced section is an annular shoulder $b^{39}$ adapted to bear upon the upper surface of the eyelet in the clenching operation. The chute $b^{10}$ is bowed forwardly to pass the head of the lever $b^3$, and the lower end of the chute is adapted to enter a slot $b^{40}$ in the lower end of the sleeve $b^1$ (which projects below the head $b^2$ of the arm $B^1$) so as to present an eyelet beneath the plunger and above the die $b^{15}$, as shown in Fig. 8. The lower extremity of the chute is equipped laterally with a spring $b^{41}$ having an inturned end $b^{42}$, serving to retain the eyelets, as illustrated in Fig. 9. The chute is equipped near its lower end with a guide member $b^{43}$ which moves upon a guide-pin $b^{44}$ projecting from the front side of the lower portion of the head $b^2$ of the arm $B^1$.

Figures 17, 18:
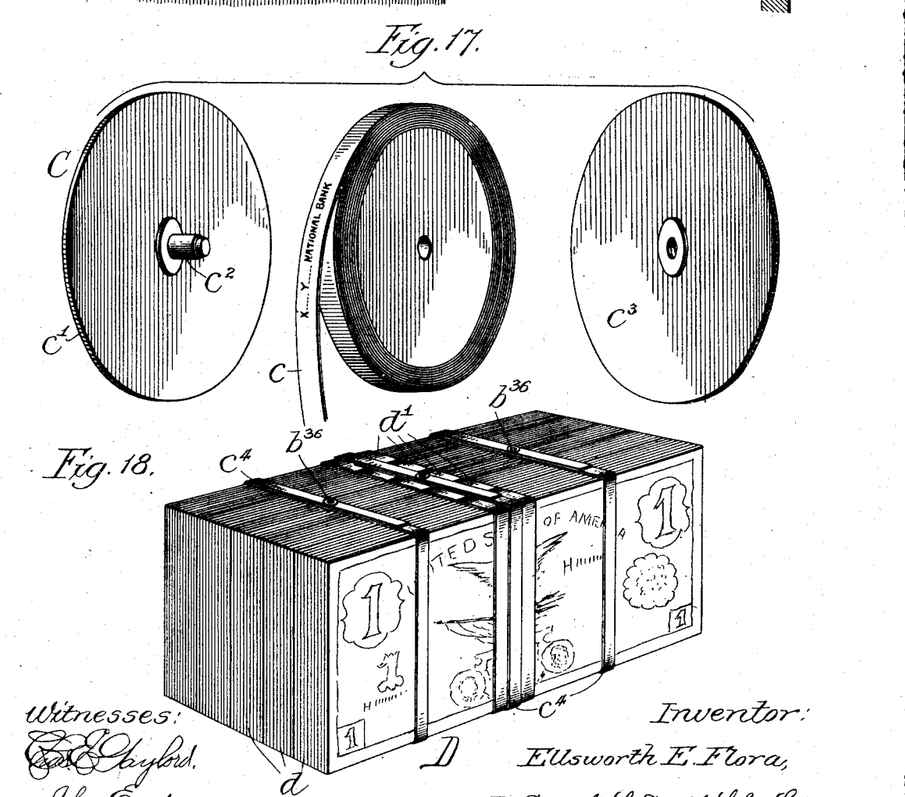
Fig. 17, a perspective view illustrating the parts of the spool or bobbin employed and the tape used in connection therewith.
Fig. 18, a perspective view showing a package pressed and sealed by the improved mechanism.

The spool, or bobbin, C comprises, as shown in Fig. 17, a disk $c^1$ equipped on its inner side with a stud $c^2$ having a threaded extremity upon which is screwed a removable disk $c^3$. The stud $c^2$ forms the core upon which the tape $c$ is wound. The tape may have printed upon it at intervals the name of the user, for instance, X Y National Bank.

In Fig. 18 is illustrated a bale D of money packages $d$, each package having a central paper band $d^1$ about it. The bale is secured by bands $c^4$ formed of the tape $c$, the end portions of each band being joined by rivets, or eyelets, $b^{36}$.

Figure 1:
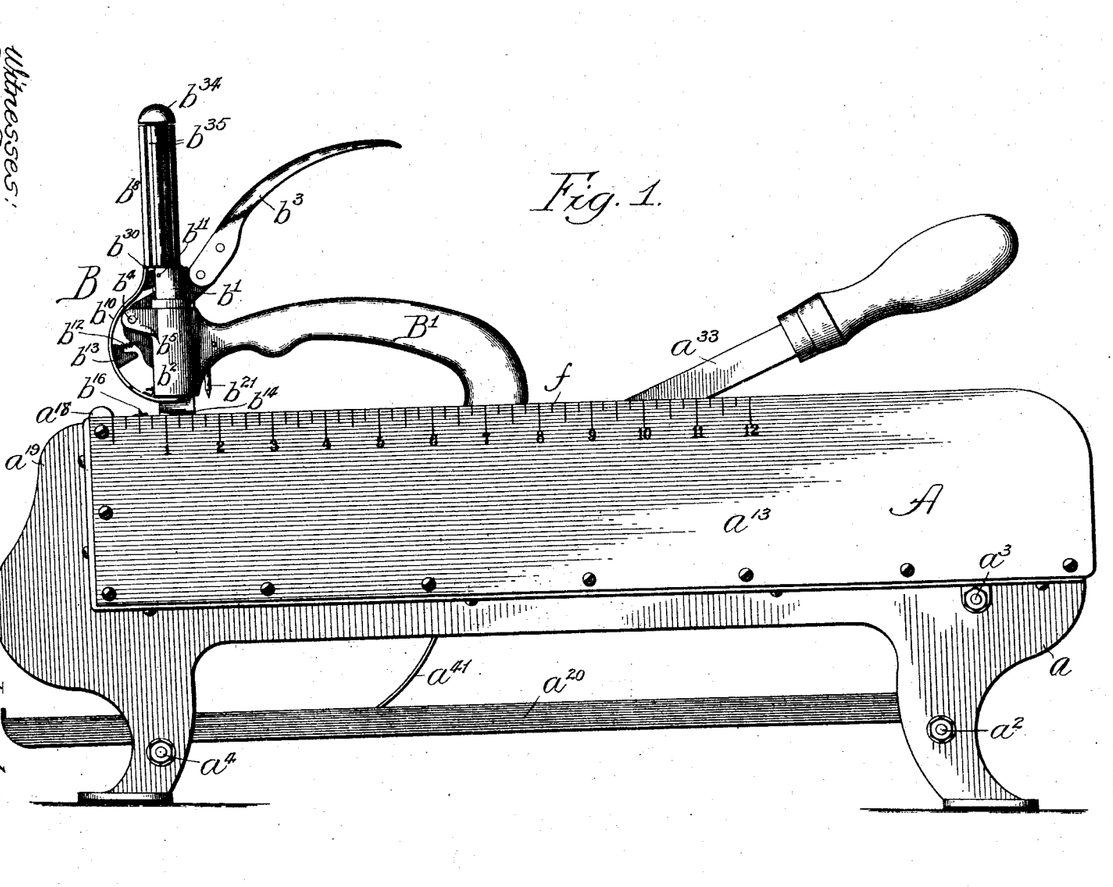
Figure 1 is a side elevational view of my improved machine.

In Fig. 1, the side $a^{13}$ of the body of the press is shown provided with a scale $f$, which is useful for indicating the degree of compression of the bale, as is evident.

Figures 12, 13:
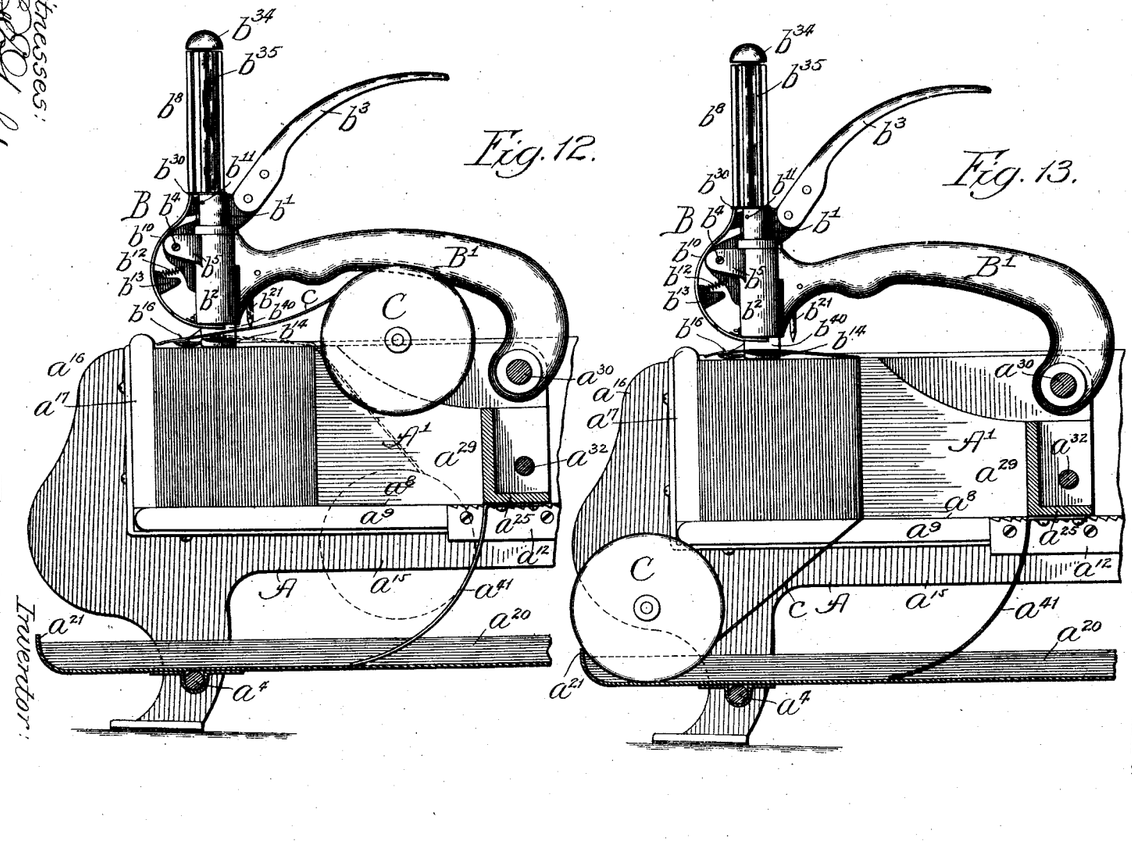
Fig. 12, a broken sectional view illustrating the position of the parts preparatory to dropping the spool in the operation of passing the tape about the compressed package, the dotted lines indicating the first position of the spool after dropping.
Fig. 13, a similar view showing the spool in the position which it occupies after carrying the tape beneath the package.
Figure 14:
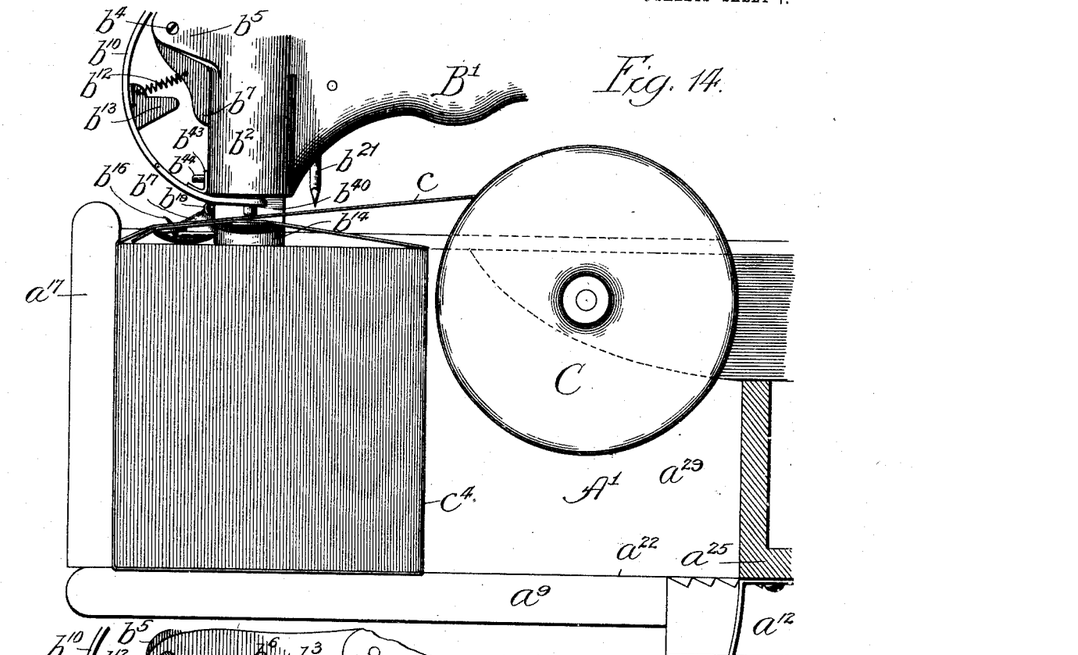
Fig. 14, a somewhat similar view upon an enlarged scale showing the position of the parts after the spool has been lifted from the position shown in Fig. 13 and carried over the package to complete the looping of the tape about the package, this view showing, also, the reduced end of the plunger of the eyelet-applying mechanism entered in the eyelet about to be used.
Figure 15:
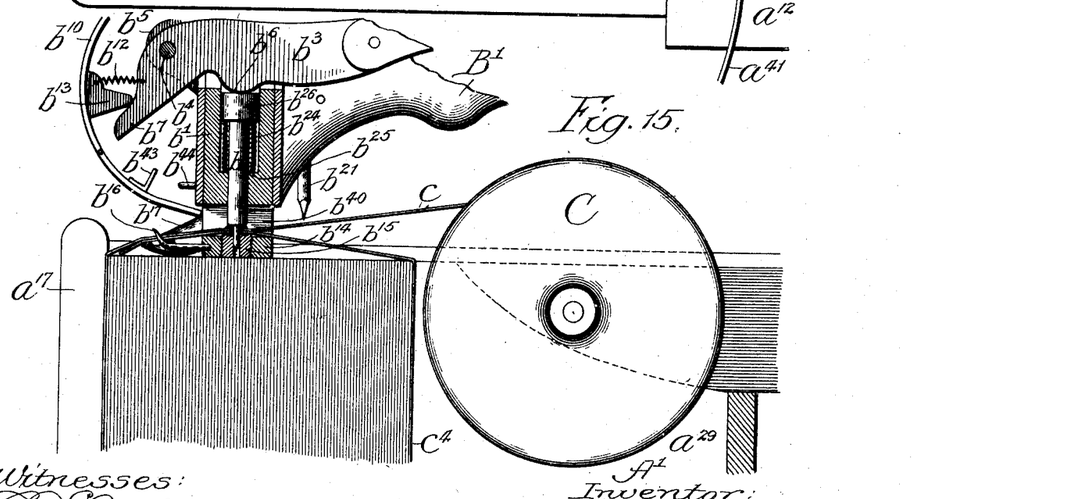
Fig. 15, a broken sectional view showing the position of the parts at the instant when insertion and clenching of the eyelet are completed.
Figure 16:
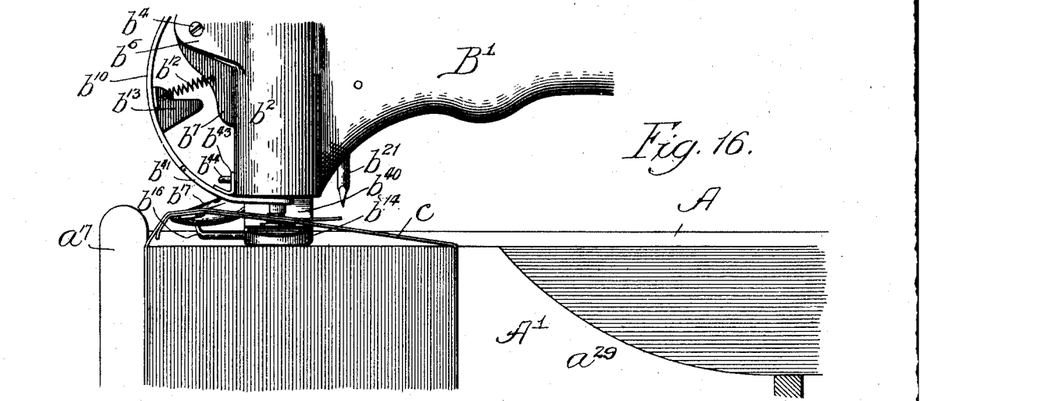
Fig. 16, a view similar to Fig. 14 and illustrating the manner of releasing the band formed about the package from the point on which the extremity of the tape is impaled preparatory to passing the tape about the package, as illustrated in Fig. 12.

The manner of using the improved machine will be readily understood. In Fig. 3, the position of the platen, or follower, of the press is that which it occupies after the compression of the bale. The follower may be retracted, however, by lifting the handle $a^{33}$, when the shoulder $a^{38}$ on the base of the handle will encounter the shoulders $a^{37}$ of the pawls $a^{36}$ and lift the pawls free from the racks, said pawls serving, upon further movement, to lift the pawls $a^{34}$ free from the racks, after which the follower of the press may be retracted. Preparatory to this movement, the arm $B^1$ may be swung upwardly about its pivot to disengage it from the bale. The arm is capable of swinging rearwardly to a position with the lever $b^3$ resting upon the bottom of the press. When in this position, the packages of currency may be placed in the press, after which the handle $a^{33}$ may be operated to compress the packages into a compact bale, after which the arm $B^1$ may be swung to the position which it occupies in Fig. 12. The free end of the tape $c$ may then be pressed over the point $b^{16}$ and the spool allowed to drop to the dotted position shown in Fig. 12, whence it will roll to the position shown in full lines in Fig. 13, assuming the arm $B^1$ to have been initially located above one of the run-ways $a^{20}$. The spool may then be lifted and carried up in front of and over the bale to the position shown in Fig. 14, thereby completing the loop or band $c^4$, it being observed that both ends of the band pass over the anvil $b^{14}$ and beneath the eyelet which is in readiness for use. Upon depression of the lever $b^3$ to the position shown in Fig. 15, the plunger $b$ is depressed, its lower reduced end entering the eyelet, as shown in Fig. 14, and then piercing the ends of the band. During this movement, also, the cam $b^7$ encounters the cam $b^{13}$ of the movable chute $b^{10}$, forcing the lower end of the chute forwardly, while the eyelet impaled on the lower end of the plunger is held thereby and extracted from the chute, as illustrated in Figs. 9 to 11. During the final downward movement of the lever $b^3$ the small end of the eyelet is forced through the opening produced by the lower end of the plunger in the end portions of the band, and the eyelet is split upon the anvil and flanged at its lower end, as clearly appears from Fig. 15. It is to be observed that the die $b^{15}$ has a central perforation for receiving the reduced end of the plunger, and is made conical and dished at its upper portion to spread the lower end of the eyelet and effect a secure clenching of the same. After the completion of the eyelet-applying operation, the tape may be severed on the knife $b^{21}$. The eyelet-applying mechanism may then be shifted laterally upon the shaft $a^{30}$ to bring it to a position above another runway $a^{20}$, when the operation may be repeated. Three runways are shown, one occupying a central longitudinal plane, so that three bands may be applied to a bale by the use of the machine illustrated. Of course, provision may be made for applying any number of bands.

I have described my invention in detail for clearness of understanding, and no undue limitation is to be understood.

The feature of slotting the bottom and end of the body of the press and the follower of the press to enable the tape to be passed about the bale in the manner indicated is one of great importance. Likewise, the feature of providing a laterally shiftable staple-applying device is of importance; and it is regarded as a feature of considerable advantage to mount the eyelet-applying device on the follower of the press. As indicated, however, the details of construction of a machine of this character may vary greatly.

What I regard as new, and desire to secure by Letters Patent, is—

1. The combination with a press adapted to compress a package, said press being provided with a runway, of a tape-carrying spool adapted to move in said runway, and means for joining the tape in a band about the package.

2. The combination of a press having a body provided with a slotted bottom and a slotted end, a slotted follower for the press, a spool adapted to move through the slots of the press, and means for joining tape in a band encircling the package.

3. The combination of a press having a slidable follower provided with a passage, a tape-carrying spool adapted to pass through said passage, and tape-securing mechanism mounted on said follower.

4. The combination of a press having a slidable follower and provided with a plurality of passages for tape, and laterally shiftable tape-securing mechanism mounted on the follower.

5. The combination of a press having a slidable follower and provided with a plurality of passages for tape, and pivotally supported laterally adjustable tape-securing mechanism mounted on the follower.

6. The combination with a press, of rivet-applying mechanism having a laterally presented anvil and a movable die co-acting with said anvil.

7. The combination with a press, of band-securing mechanism having a laterally presented anvil, a movable die co-acting with said anvil, and a magazine co-acting therewith.

8. The combination with a press, of band-securing mechanism having a laterally presented anvil, a movable die co-acting with said anvil, and a magazine having a movable chute co-acting therewith.

9. The combination with a press, of means for passing a tape about a package located in the press, band-securing mechanism having a laterally presented anvil, and a movable die co-acting with said anvil.

10. The combination with a press, of means for passing a tape about a package located in the press, band-securing mechanism having a laterally presented anvil, a movable die co-acting with said anvil, and a magazine co-acting therewith.

11. The combination with a press, of means for passing a tape about a package located in the press, band-securing mechanism having a laterally presented anvil, a movable die co-acting with said anvil, and a magazine having a movable chute co-acting therewith.

12. The combination with a press, of band-securing mechanism comprising an anvil, a plunger having a reduced end, and an eyelet magazine having a chute co-acting with said plunger.

13. The combination with a press, of band-securing mechanism comprising an anvil, a plunger co-acting therewith, eyelet-applying mechanism having a movable chute, and a plunger-actuating lever with means for retracting said chute.

14. The combination with a press, of band-securing mechanism comprising a pivoted arm, an anvil carried thereby, a plunger co-acting with said anvil, a magazine mounted on said arm and equipped with a movable chute, and a plunger-actuating lever equipped with means for retracting the chute.

15. The combination with a press, of band-applying mechanism comprising an anvil, a tape-impaling device adjacent to the anvil, and a plunger co-acting with the anvil.

16. The combination with a press, of tape-applying mechanism comprising an anvil, a tape-impaling device adjacent to the anvil, means for passing tape about a package in the press, a plunger co-acting with the anvil, a plunger-actuating lever, and means for feeding eyelets into the path of the plunger.

17. The combination with a press, of tape-applying mechanism comprising an anvil, a tape-impaling device adjacent to the anvil, a plunger co-acting with the anvil, a plunger-actuating lever, a magazine having a movable chute serving to feed eyelets to the path of the plunger, and means actuated by said lever for retracting the chute.

18. The combination with a press, of band-applying mechanism comprising an anvil, band-holding means adjacent to the anvil, a plunger having a reduced lower end, an eyelet magazine having a movable chute extending to a point beneath the plunger and adapted to feed eyelets into the path of the plunger, and means for actuating the plunger and retracting said chute.

19. The combination with a press having channels for passing bands about a package within the press, of band-securing mechanism comprising an anvil, band-holding means adjacent to the anvil, a plunger co-acting with the anvil and having a reduced lower end, a magazine having a movable chute with its lower end projecting into the path of the plunger, and plunger-actuating and chute-retracting means.

20. The combination with a press and means for passing a band about a package within the press, of an adjustable arm equipped with an anvil, a plunger carried by said arm and co-acting with said anvil, a revoluble magazine mounted on said arm and equipped with a plurality of channels for eyelets, a movable chute co-acting with said magazine and extending into the path of the plunger, and means for actuating said plunger and retracting said chute.

21. The combination with a press, of a pivoted arm equipped with an anvil, a plunger, a pivoted chute, plunger-actuating and chute-retracting means, and a magazine having a plurality of chambers and movable to bring its several chambers successively into registration with said chute.

22. The combination of a press having a body with a stationary end, a follower movable longitudinally in said body, follower actuating means, and a laterally adjustable pivotally supported arm mounted on said follower and equipped with band-securing mechanism.

23. The combination of a press having a slotted bottom and slotted end, a follower movable in said press, actuating means for the follower, and a laterally adjustable pivotally supported arm mounted on said follower and equipped with means for securing the ends of bands together.

24. The combination of a press having a bottom and end provided with slots, a runway beneath said slots, a follower having a passage therethrough for a spool and equipped with means for conducting the spool into the runway, regardless of the position of the follower, and band-securing mechanism.

25. The combination of a press having a plurality of longitudinal slots in its bottom and a plurality of slots in its end, a plurality of runways beneath said slots, a follower for the press having a plurality of passages and depending members co-acting with said runways, and band-securing means, for the purpose set forth.

26. The combination with a press having a passage for a band, of band-securing mechanism comprising an anvil, an impaling point adjacent to the anvil, a plunger co-acting with the anvil, and a device for raising the band from the impaling point after the ends of the band have been secured together.

27. The combination with a press having a passage for a band, of band-securing mechanism comprising an anvil, an impaling point adjacent to the anvil, a plunger co-acting with the anvil, and a band-raising lever having an end co-acting with the impaling point and adapted to bear beneath the band, whereby the band may be freed from the impaling point, for the purpose set forth.

28. The combination with a press, of a laterally adjustable pivotally supported arm, an anvil carried thereby, a tape-severing knife adjacent to said anvil, an impaling point adjacent to and on the other side of said anvil, and a plunger co-acting with said anvil.

29. The combination with a press of a pivotally supported arm, an anvil carried thereby, a plunger reciprocable above the anvil, a plunger-actuating lever having a handle-portion extending rearwardly over the arm, pivotal connection between said lever and the extremity of said arm, a pivoted eyelet chute, a cam on the extremity of said lever for retracting the chute, and a magazine mounted on said arm and co-acting with the eyelet chute.

30. A press comprising bottom slats and end slats, reinforcing members for the end slats, a follower movable longitudinally in the press, and actuating means for the follower, in combination with an adjustable arm equipped with band-securing means, for the purpose set forth.

31. A press for the purpose set forth, comprising a body having a bottom and end provided with a plurality of slots, a plurality of forwardly declining runways beneath said slots, and a follower for the press having a plurality of slots with means projecting beneath the same to points above said runways, whereby a spool may be dropped through the slots of the follower into the runways.

ELLSWORTH E. FLORA.

In presence of—
M. S. MACKENZIE,
J. H. LANDES.